United States Patent
Peng et al.

(10) Patent No.: US 12,012,297 B2
(45) Date of Patent: Jun. 18, 2024

(54) AVOIDANCE CONVEYING DEVICE AND METHOD FOR GLASS PRODUCTION LINE

(71) Applicant: China Triumph International Engineering Co., Ltd., Shanghai (CN)

(72) Inventors: Shou Peng, Shanghai (CN); Liyun Ma, Shanghai (CN); Honghan Ding, Shanghai (CN); Peiguang Yang, Shanghai (CN); Rui Liu, Shanghai (CN); Ming Cheng, Shanghai (CN)

(73) Assignee: China Triumph International Engineering Co., Ltd., Shanghai (CN)

( * ) Notice: Subject to any disclaimer, the term of this patent is extended or adjusted under 35 U.S.C. 154(b) by 0 days.

(21) Appl. No.: 18/337,406

(22) Filed: Jun. 19, 2023

(65) Prior Publication Data

US 2023/0406647 A1    Dec. 21, 2023

(30) Foreign Application Priority Data

Jun. 21, 2022 (CN) .......................... 202210706668.2

(51) Int. Cl.
  *B65G 49/06* (2006.01)
  *B65G 13/00* (2006.01)

(52) U.S. Cl.
  CPC ............ *B65G 49/064* (2013.01); *B65G 13/00* (2013.01)

(58) Field of Classification Search
  CPC ...... B65G 47/24; B65G 49/06; B65G 49/063; B65G 49/064; B65G 49/067; C03B 35/14; C03B 35/16

(Continued)

(56) References Cited

U.S. PATENT DOCUMENTS 4,662,925 A * 5/1987 Thimons ................. C03B 35/14
                                                             65/273
7,748,519 B2 * 7/2010 Freudelsperger ...... B65G 69/16
                                                             198/523

(Continued)

FOREIGN PATENT DOCUMENTS

| CN | 111186704 A | 5/2020 |
| CN | 112340450 A | 2/2021 |

(Continued)

OTHER PUBLICATIONS

US 2021/0253371 A1, Hotger et al., Aug. 19 (Year: 2021).*
WO 2020/038945 A1, Hotger et al., Feb. 27 (Year: 2020).*

*Primary Examiner* — Douglas A Hess
(74) *Attorney, Agent, or Firm* — IPRTOP LLC

(57) ABSTRACT

An avoidance conveying device and an avoidance conveying method are provided. The device includes a receiving device, a front lifting device, a transition device, a rear lifting device, and a sending device arranged in sequence along a direction of conveying glass sheets; the receiving device receives the glass sheets conveyed by a front roller conveyor of an original sheet production line; the sending device conveys the glass sheets to a rear roller conveyor of the original sheet production line; an avoidance channel is formed between the front lifting device and the rear lifting device. Pedestrians and forklifts directly pass through the glass production line at any time through the avoidance channel, shortening the travel distance and the travel duration of pedestrians and forklifts. The glass sheets are finally conveyed to the rear roller conveyor by bypassing the avoidance channel, which ensures continuous and uninterrupted transportation of the glass sheets.

20 Claims, 2 Drawing Sheets

(58) Field of Classification Search
USPC .................................................. 198/539, 631
See application file for complete search history.

(56) References Cited

U.S. PATENT DOCUMENTS

| | | | | |
|---|---|---|---|---|
| 9,079,791 | B2 * | 7/2015 | Nitschke | ............... C03B 35/147 |
| 9,914,590 | B2 * | 3/2018 | Akiyama | ............... F16C 13/003 |
| 10,683,227 | B2 * | 6/2020 | Nitschke | ................. C03B 23/03 |
| 10,689,208 | B2 * | 6/2020 | Mader | .................... B65G 47/24 |
| 10,815,077 | B2 * | 10/2020 | Fontes | ................. B65G 49/062 |
| 10,851,013 | B2 * | 12/2020 | Vild | ................... G01M 11/0264 |
| 10,858,197 | B2 * | 12/2020 | Karol | ...................... B65G 41/00 |
| 11,673,749 | B2 * | 6/2023 | Plant | ....................... C03B 33/03 |
| | | | | 225/94 |
| 2017/0073164 | A1 | 3/2017 | Akiyama et al. | |
| 2019/0218042 | A1 | 7/2019 | Mader et al. | |

FOREIGN PATENT DOCUMENTS

| | | |
|---|---|---|
| CN | 114348657 A | 4/2022 |
| CN | 114408575 Y | 4/2022 |
| CN | 216234853 Y | 4/2022 |
| CN | 114516541 A | 5/2022 |
| EP | 4183718 A1 * | 5/2023 ........... B65G 1/0428 |

\* cited by examiner

AVOIDANCE CONVEYING DEVICE AND METHOD FOR GLASS PRODUCTION LINE

CROSS REFERENCE TO RELATED APPLICATION

The present application claims the benefit of priority to Chinese Patent Application No. CN 202210706668.2, entitled "Avoidance Conveying Device and Method for Glass Production Line", filed with CNIPA on Jun. 21, 2022, the disclosure of which is incorporated herein by reference in its entirety.

FIELD OF TECHNOLOGY

The present disclosure relates to the field of glass production, in particular to an avoidance conveying device and method for a glass production line.

BACKGROUND

Glass is widely used in construction, daily use, art, medical, chemical, electronic, instrumentation, nuclear engineering and other fields. With the rapid development of the economy and society, people's demand for glass is increasing. This has led to an increase in the number of glass production lines in a single production workshop, and the length of a single glass production line is also longer than before, for example, some glass production lines can even reach 1.5 kilometers in length. Glass production lines usually include hot-end production lines, cold-end production lines, deep-processing production lines, stacking production lines, and packaging and storage production lines. In existing glass production workshops, multiple glass production lines are generally arranged in parallel with intervals. When equipment on a glass production line which is located at the inside of the glass production workshop needs to be maintained or glass on the glass production line which is located at the inside of the glass production workshop needs to be conveyed, workers and forklifts often have to take a detour from an end of the long glass production line, which is time-consuming and laborious, very inconvenient, and greatly affects the production efficiency of the entire glass production lines.

SUMMARY

The present disclosure provides an avoidance conveying device and method for a glass production line, which allow pedestrians and forklifts to directly pass through a glass production line at any time through an avoidance channel, and ensure continuous and uninterrupted production operations (e.g., continuously and uninterruptedly conveying the glass sheets) on the glass production line. Therefore, the present disclosure effectively solves the technical problem of affecting the production efficiency of glass due to pedestrians and forklifts having to take a detour from an end of the glass production line in the related art.

A first aspect of the present disclosure provides an avoidance conveying device for a glass production line, including a receiving device, a front lifting device, a transition device, a rear lifting device, and a sending device arranged in sequence along a direction of conveying glass sheets. The avoidance conveying device is set to be a symmetrical structure centered on the transition device. The receiving device is configured to receive the glass sheets conveyed by a front roller conveyor of an original sheet production line. The front lifting device is configured to convey the glass sheets from the receiving device to the transition device. The transition device is configured to convey the glass sheets from the front lifting device to the rear lifting device. The rear lifting device is configured to convey the glass sheets from the transition device to the sending device. The sending device is configured to convey the glass sheets to a rear roller conveyor of the original sheet production line. An avoidance channel is formed between the front lifting device and the rear lifting device. The receiving device, the front lifting device, the transition device, the rear lifting device, and the sending device are configured to sequentially convey the glass sheets from the front roller conveyor to the rear roller conveyor of the original sheet production line to make the glass sheets bypass the avoidance channel.

In an embodiment of the first aspect of the present disclosure, upon the transition device being a bridge-type structure and being located above the avoidance channel, the front lifting device is configured to convey the glass sheets from the receiving device upward to the transition device, and the rear lifting device is configured to convey the glass sheets from the transition device downward to the sending device.

In an embodiment of the first aspect of the present disclosure, the avoidance conveying device further includes a supporting protective wall, arranged in a space formed by the front lifting device, the transition device, and the rear lifting device, wherein the transition device is installed at a top of the supporting protective wall.

In an embodiment of the first aspect of the present disclosure, upon the transition device being an underground structure and being located below the avoidance channel, the front lifting device is configured to convey the glass sheets from the receiving device downward to the transition device, and the rear lifting device is configured to convey the glass sheets from the transition device upward to the sending device.

In an embodiment of the first aspect of the present disclosure, a first duration required for the receiving device to load the glass sheets conveyed by the front roller conveyor is not less than a first lifting cycle of the front lifting device, wherein the first lifting cycle is a duration required for the front lifting device to move from a front initial position of the front lifting device to a front working position of the front lifting device and then back to the front initial position from the front working position; a second duration required for the sending device to unload the glass sheets conveyed to the rear roller conveyor is not greater than a second lifting cycle of the rear lifting device, wherein the second lifting cycle is a duration required for the rear lifting device to move from a rear initial position of the rear lifting device to a rear working position of the rear lifting device and then back to the rear initial position from the rear working position.

In an embodiment of the first aspect of the present disclosure, the receiving device includes a multi-layer receiving roller conveyor arranged along a vertical direction, wherein a first spacing distance between any two adjacent layers of the multi-layer receiving roller conveyor is equal, and the multi-layer receiving roller conveyor is configured to move up and down in a stepwise manner along the vertical direction within the receiving device, wherein a step distance of the multi-layer receiving roller conveyor is equal to the first spacing distance; the front lifting device includes a multi-layer front conveying roller conveyor arranged along the vertical direction, wherein a second spacing distance between any two adjacent layers of the multi-layer front conveying roller conveyor is equal, and the multi-layer front conveying roller conveyor is configured to move up and down along the vertical direction within the front lifting device; the transition device includes a multi-layer transition roller conveyor arranged along the vertical direction, wherein a third spacing distance between any two adjacent layers of the multi-layer transition roller conveyor is equal; the rear lifting device includes a multi-layer rear conveying roller conveyor arranged along the vertical direction, wherein the multi-layer rear conveying roller conveyor is configured to move up and down along the vertical direction within the rear lifting device, wherein a fourth spacing distance between any two adjacent layers of the multi-layer rear conveying roller conveyor is equal; the sending device includes a multi-layer sending roller conveyor arranged along the vertical direction, a fifth spacing distance between any two adjacent layers of the multi-layer sending roller conveyor is equal, and the multi-layer sending roller conveyor is configured to move up and down in a stepwise manner along the vertical direction within the sending device, wherein a step distance of the multi-layer sending roller conveyor is equal to the fifth spacing distance; wherein the first spacing distance, the second spacing distance, the third spacing distance, the fourth spacing distance, and the fifth spacing distance are equal, and a number of layers of the multi-layer receiving roller conveyor, the multi-layer front conveying roller conveyor, the multi-layer transition roller conveyor, the multi-layer rear conveying roller conveyor, and the multi-layer sending roller conveyor is equal.

In an embodiment of the first aspect of the present disclosure, the first duration is a duration required for the multi-layer receiving roller conveyor of the receiving device to load the glass sheets conveyed by the front roller conveyor, which is not less than the first lifting cycle; and the second duration is a duration required for the multi-layer sending roller conveyor of the sending device to unload the glass sheets to the rear roller conveyor, which is not greater than the second lifting cycle.

In an embodiment of the first aspect of the present disclosure, the glass sheets include one or more of whole glass, middle partition glass, and multi-partition glass.

In an embodiment of the first aspect of the present disclosure, the multi-layer receiving roller conveyor, the multi-layer front conveying roller conveyor, the multi-layer transition roller conveyor, the multi-layer rear conveying roller conveyor, and the multi-layer sending roller conveyor are belt conveyors or roller conveyors.

In an embodiment of the first aspect of the present disclosure, the multi-layer receiving roller conveyor, the multi-layer front conveying roller conveyor, the multi-layer rear conveying roller conveyor, and the multi-layer sending roller conveyor move up and down through chain drive, gear drive or synchronous belt drive.

A second aspect of the present disclosure provides an avoidance conveying method for a glass production line, applied to the avoidance conveying device for the glass production line described in any one of the first aspects of the present disclosure, wherein a first end of the front lifting device away from the transition device is a front initial position, a second end of the front lifting device close to the transition device is a front working position, a first end of the rear lifting device close to the transition device is a rear initial position, and a second end of the rear lifting device away from the transition device is a rear working position, wherein the avoidance conveying method includes: step S1, receiving, using the receiving device, the glass sheets conveyed by the front roller conveyor of the original sheet production line; step S2, conveying, using the receiving device, the glass sheets on the receiving device to the front lifting device at the front initial position docked with the receiving device; step S3, conveying, using the front lifting device, the glass sheets from the front initial position to the front working position, the front lifting device running to the front working position to dock with the transition device; step S4, conveying the glass sheets on the front lifting device to the transition device docked with the front lifting device; step S5, conveying, using the transition device, the glass sheets from one side of the transition device to the other side of the transition device, and conveying the glass sheets on the transition device to the rear lifting device at the rear initial position docked with the transition device; step S6, conveying, using the rear lifting device, the glass sheets from the rear initial position to the rear working position, the rear lifting device running to the rear working position to dock with the sending device; step S7, conveying, the glass sheets on the rear working position of the rear lifting device to the sending device docked with the rear working position; and step S8, conveying, using the sending device, the glass sheets on the sending device to the rear roller conveyor of the original sheet production line; wherein the avoidance channel between the front lifting device and the rear lifting device is configured for pedestrians and forklifts to pass through the glass production line at any time, and the receiving device, the front lifting device, the transition device, the rear lifting device, and the sending device are configured to sequentially convey the glass sheets from the front roller conveyor to the rear roller conveyor of the original sheet production line to bypass the avoidance channel.

In an embodiment of the second aspect of the present disclosure, step S1 includes: aligning a layer of a multi-layer receiving roller conveyor of the receiving device with the front roller conveyor of the original sheet production line, conveying the glass sheets on the front roller conveyor to the layer of the multi-layer receiving roller conveyor, and aligning each layer of the multi-layer receiving roller conveyor one-to-one with each layer of a multi-layer front conveying roller conveyor of the front lifting device at the front initial position when a last layer of the multi-layer receiving roller conveyor is aligned with the front roller conveyor; step S2 includes: conveying the glass sheets on the multi-layer receiving roller conveyor to the multi-layer front conveying roller conveyor; step S3 includes: conveying, using the multi-layer front conveying roller conveyor, the glass sheets vertically from the front initial position to the front working position, and aligning each layer of the multi-layer front conveying roller conveyor one-to-one with each layer of a multi-layer transition roller conveyor of the transition device; step S4 includes: conveying the glass sheets on the multi-layer front conveying roller conveyor to the multi-layer transition roller conveyor; step S5 includes: conveying, using the multi-layer transition roller conveyor, the glass sheets from one side of the transition device to the other side of the transition device, and conveying the glass sheets on the multi-layer transition roller conveyor to a multi-layer rear conveying roller conveyor of the rear lifting device, wherein each layer of the multi-layer transition roller conveyor is aligned one-to-one with each layer of the multi-layer rear conveying roller conveyor, and the multi-layer rear conveying roller conveyor is located at the rear initial position; step S6 includes: conveying, using the multi-layer rear conveying roller conveyor, the glass sheets vertically from the rear initial position to the rear working position, and aligning each layer of the multi-layer rear conveying roller conveyor one-to-one with each layer of a multi-layer sending roller conveyor of the sending device; step S7 includes: conveying, the glass sheets on the multi-layer rear conveying roller conveyor to the multi-layer sending roller conveyor; and step S8 includes: aligning a layer of the multi-layer sending roller conveyor with the rear roller conveyor of the original sheet production line, conveying the glass sheets on the layer of the multi-layer sending roller conveyor to the rear roller conveyor, and repeating the aligning operation and the conveying operation in step S8 until the glass sheets on each layer of the multi-layer sending roller conveyor are conveyed to the rear roller conveyor.

In an embodiment of the second aspect of the present disclosure, when the transition device is a bridge-type structure and is located above the avoidance channel, step S3 includes: in the front lifting device, conveying, using the multi-layer front conveying roller conveyor, the glass sheets vertically upward from the front initial position to the front working position, and aligning each layer of the multi-layer front conveying roller conveyor one-to-one with each layer of the multi-layer transition roller conveyor, and step S6 includes: in the rear lifting device, conveying, using the multi-layer rear conveying roller conveyor, the glass sheets vertically downward from the rear initial position to the rear working position, and aligning each layer of the multi-layer rear conveying roller conveyor one-to-one with each layer of the multi-layer sending roller conveyor.

In an embodiment of the second aspect of the present disclosure, after step S2, the avoidance conveying method further includes: resetting the multi-layer receiving roller conveyor to align a bottom layer of the multi-layer receiving roller conveyor with the front roller conveyor of the original sheet production line.

In an embodiment of the second aspect of the present disclosure, after step S4, the avoidance conveying method further includes: resetting the multi-layer front conveying roller conveyor to the front initial position.

In an embodiment of the second aspect of the present disclosure, after step S7, the avoidance conveying method further includes: resetting the multi-layer rear conveying roller conveyor to the rear initial position to align the multi-layer rear conveying roller conveyor with the multi-layer transition roller conveyor.

In an embodiment of the second aspect of the present disclosure, after step S8, the avoidance conveying method further includes: resetting the multi-layer sending roller conveyor to align a top layer of the multi-layer sending roller conveyor with the rear roller conveyor of the original sheet production line.

In an embodiment of the second aspect of the present disclosure, when the transition device is an underground structure and is located below the avoidance channel, step S3 includes: in the front lifting device, conveying, using the multi-layer front conveying roller conveyor, the glass sheets vertically downward from the front initial position to the front working position, and aligning each layer of the multi-layer front conveying roller conveyor one-to-one with each layer of the multi-layer transition roller conveyor, and step S6 includes: in the rear lifting device, conveying, using the multi-layer rear conveying roller conveyor, the glass sheets vertically upward from the rear initial position to the rear working position, and aligning each layer of the multi-layer rear conveying roller conveyor one-to-one with each layer of the multi-layer sending roller conveyor.

In an embodiment of the second aspect of the present disclosure, after step S2, the avoidance conveying method further includes: resetting the multi-layer receiving roller conveyor to align a top layer of the multi-layer receiving roller conveyor with the front roller conveyor of the original sheet production line.

In an embodiment of the second aspect of the present disclosure, after step S4, the avoidance conveying method further includes: resetting the multi-layer front conveying roller conveyor to the front initial position.

In an embodiment of the second aspect of the present disclosure, after step S7, the avoidance conveying method further includes: resetting the multi-layer rear conveying roller conveyor to the rear initial position, and aligning each layer of the multi-layer rear conveying roller conveyor one-to-one with each layer of the multi-layer transition roller conveyor.

In an embodiment of the second aspect of the present disclosure, after step S8, the avoidance conveying method further includes: resetting the multi-layer sending roller conveyor to align a bottom layer of the multi-layer sending roller conveyor with the rear roller conveyor of the original sheet production line.

A third aspect of the present disclosure provides a glass production line including a plurality of avoidance conveying devices described in any one of the first aspects of the present disclosure.

In an embodiment of the third aspect of the present disclosure, at least one of the plurality of avoidance conveying devices includes a transition device having a bridge-type structure, and at least one of the plurality of avoidance conveying devices includes a transition device having an underground structure.

In an embodiment, the plurality of avoidance conveying devices conveys the glass sheets using the above avoidance conveying method.

Compared with the related art, the present disclosure has the following beneficial effects: in the avoidance conveying device and the avoidance conveying method provided by the present disclosure, the receiving device, the front lifting device, the transition device, the rear lifting device, and the sending device are arranged in sequence along the direction of conveying the glass sheets, the receiving device receives the glass sheets conveyed by the front roller conveyor of the original sheet production line, the sending device conveys the glass sheets to the rear roller conveyor of the original sheet production line, and the avoidance channel is formed between the front lifting device and the rear lifting device. It can be seen that, in the present disclosure, pedestrians and forklifts directly pass through the glass production line at any time through the avoidance channel, shortening the travel distance and the travel duration of pedestrians and forklifts. At the same time, the glass sheets conveyed from the front roller conveyor of the original sheet production line are finally conveyed to the rear roller conveyor of the original sheet production line through the receiving device, the front lifting device, the transition device, the rear lifting device, and the sending device in sequence (i.e., the glass sheets bypass the avoidance channel during conveying), which ensures continuous and uninterrupted production operations (e.g., continuously and uninterruptedly conveying the glass sheets) on the glass production line. Therefore, the present disclosure solves the technical problem of affecting the production efficiency of glass due to pedestrians and forklifts having to take a detour from an end of the glass production line in the related art, and also provides technical support for efficient processing and production of the entire glass production lines.

REFERENCE NUMERALS

Figure 1:
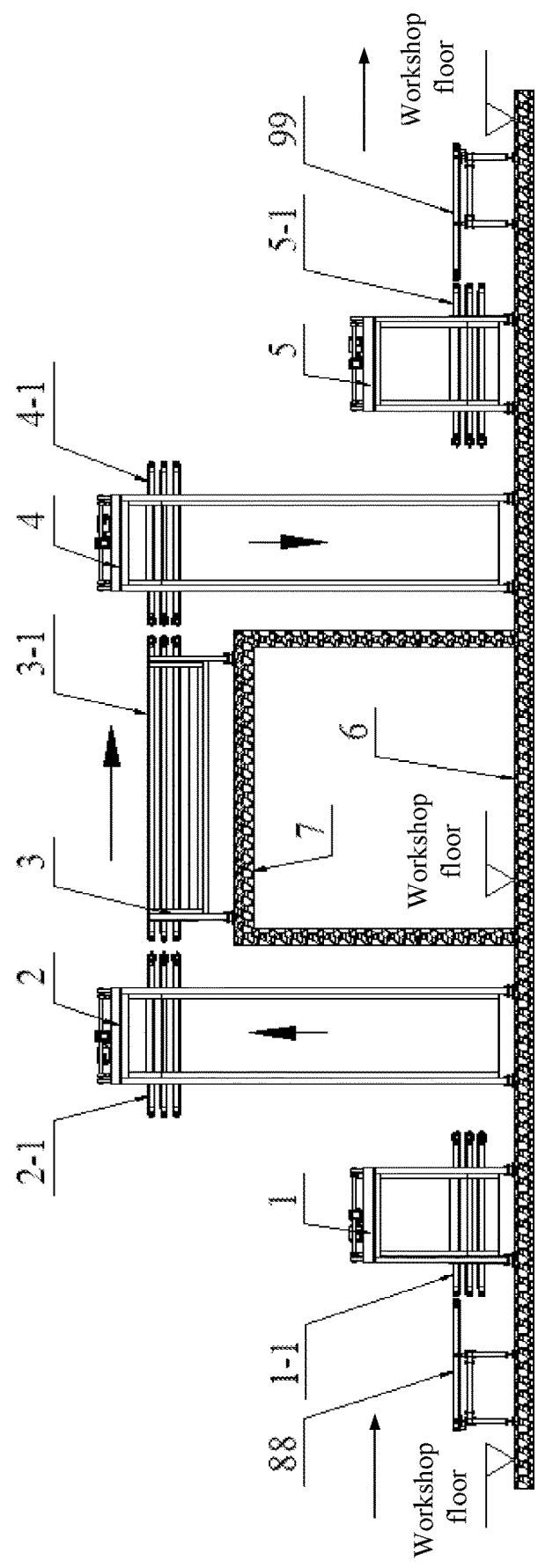
FIG. 1 is a schematic structural diagram of an avoidance conveying device for a glass production line according to an embodiment of the present disclosure.
Figure 2:
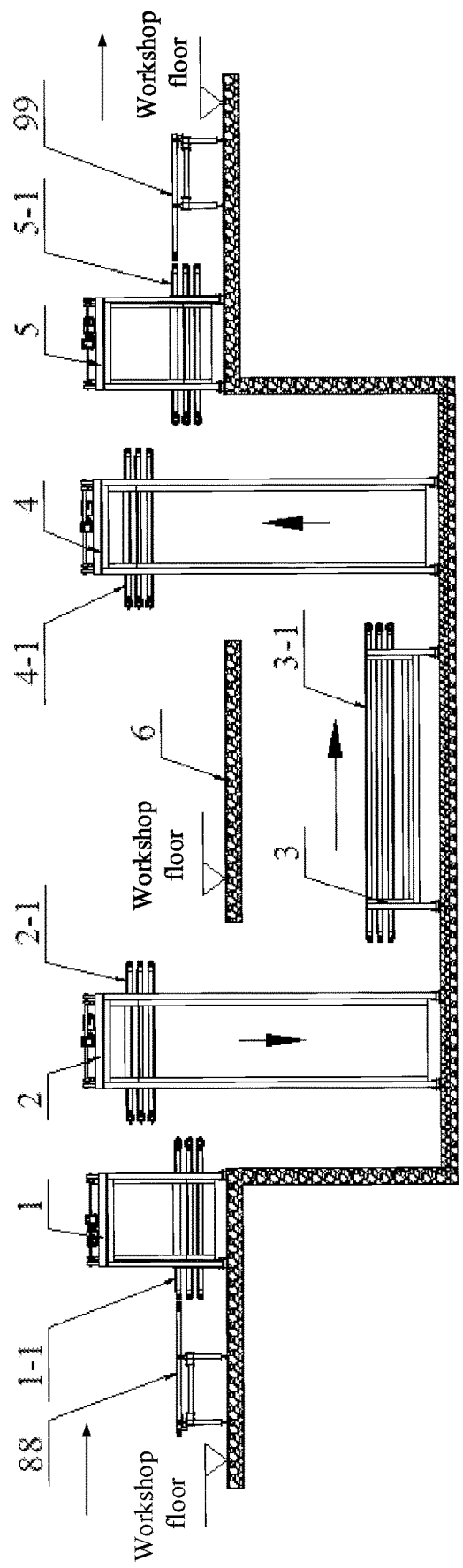
FIG. 2 is a schematic structural diagram of an avoidance conveying device for a glass production line according to another embodiment of the present disclosure.

1 Receiving device
1-1 Multi-layer receiving roller conveyor
2 Front lifting device
2-1 Multi-layer front conveying roller conveyor
3 Transition device
3-1 Multi-layer transition roller conveyor
4 Rear lifting device
4-1 Multi-layer rear conveying roller conveyor
Sending device
Multi-layer sending roller conveyor
6 Avoidance channel
7 Supporting protective wall
88 Front roller conveyor
99 Rear roller conveyor
Arrows in the FIGS. 1 and 2 indicate a direction conveying the glass sheets.

DETAILED DESCRIPTION

The specific embodiments of the present disclosure are further described in detail with reference to the accompanying drawings. It is clear that the following embodiments are for the purpose of illustrating the present disclosure and are not intended to limit the scope of the present disclosure.

The present disclosure provides an avoidance conveying device for a glass production line, which solves the technical problem of affecting the production efficiency of glass due to pedestrians and forklifts having to take a detour from an end of the glass production line. As shown in FIGS. 1 and 2, the avoidance conveying device includes a receiving device 1, a front lifting device 2, a transition device 3, a rear lifting device 4, and a sending device 5 arranged in sequence along a direction of conveying glass sheets. The avoidance conveying device is set to be a symmetrical structure centered on the transition device 3. The receiving device 1 receives the glass sheets conveyed by a front roller conveyor 88 of an original sheet production line. The front lifting device 2 conveys the glass sheets from the receiving device 1 to the transition device 3. The transition device 3 conveys the glass sheets from the front lifting device 2 to the rear lifting device 4. The rear lifting device 4 conveys the glass sheets from the transition device 3 to the sending device 5. The sending device 5 conveys the glass sheets to a rear roller conveyor 99 of the original sheet production line. An avoidance channel 6 is formed between the front lifting device 2 and the rear lifting device 4. The receiving device 1, the front lifting device 2, the transition device 3, the rear lifting device 4, and the sending device 5 sequentially convey the glass sheets from the front roller conveyor 88 of the original sheet production line to the rear roller conveyor 99 of the original sheet production line and make the glass sheets bypass the avoidance channel 6. In an embodiment, a first duration required for the receiving device 1 to load the glass sheets conveyed by the front roller conveyor 88 is not less than a first lifting cycle of the front lifting device 2, where the first lifting cycle is a duration required for the front lifting device 2 to move from a front initial position of the front lifting device 2 to a front working position of the front lifting device 2 and then back to the front initial position from the front working position; and a second duration required for the sending device 5 to unload the glass sheets conveyed by the rear roller conveyor 99 is not greater than a second lifting cycle of the rear lifting device 4, where the second lifting cycle is a duration required for the rear lifting device 4 to move from a rear initial position of the rear lifting device 4 to a rear working position of the rear lifting device 4 and then back to the rear initial position from the rear working position. The above setting avoids the stacking damage of the glass sheets, thereby ensuring the continuous and uninterrupted transportation of the glass sheets.

As shown in FIGS. 1 and 2, a first end of the front lifting device 2 away from the transition device 3 is a front initial position, a second end of the front lifting device 2 close to the transition device 3 is a front working position, a first end of the rear lifting device 4 close to the transition device 3 is a rear initial position, and a second end of the rear lifting device 4 away from the transition device 3 is a rear working position. The process of conveying the glass sheets using the avoidance conveying device provided by the present disclosure is as follows: firstly, the receiving device 1 receives the glass sheets conveyed by the front roller conveyor 88 of the original sheet production line; secondly, the receiving device 1 conveys the glass sheets on the receiving device 1 to the front initial position docked with the receiving device 1; thirdly, the front lifting device 2 conveys the glass sheets from the front initial position to the front working position to dock with the transition device; fourthly, the glass sheets on the front working position of the front lifting device 2 are conveyed to the transition device 3; fifthly, the transition device 3 conveys the glass sheets from one side of the transition device 3 to the other side of the transition device 3, and the glass sheets on the transition device 3 are conveyed to the rear lifting device 4 at the rear initial position docked with the transition device 3; sixthly, the rear lifting device 4 conveys the glass sheets from the rear initial position to the rear working position to dock with the sending device 5; seventhly, the glass sheets on the rear working position of the rear lifting device 4 are conveyed to the sending device 5; finally, the sending device 5 conveys the glass sheets on the sending device 5 to the rear roller conveyor 99 of the original sheet production line. It can be seen that the receiving device 1, the front lifting device 2, the transition device 3, the rear lifting device 4, and the sending device 5 sequentially convey the glass sheets from the front roller conveyor 88 of the original sheet production line to the rear roller conveyor 99 of the original sheet production line (in other words, the glass sheets bypass the avoidance channel 6 for pedestrians and forklifts during conveying), which ensures continuous and uninterrupted production operations (e.g., continuously and uninterruptedly conveying the glass sheets) on the glass production line. During the above-mentioned process for conveying the glass sheets, pedestrians and forklifts can directly pass through the glass production line from a workshop floor in the avoidance channel 6 at any time, shortening the travel distance and the travel duration of pedestrians and forklifts. It can be seen that the present disclosure solves the technical problem of affecting the production efficiency of glass due to pedestrians and forklifts having to take a detour from an end of the glass production line in the related art and also provides technical support for efficient processing and production of the entire glass production lines.

In an embodiment, as shown in FIGS. 1 and 2, the receiving device 1 includes a multi-layer receiving roller conveyor 1-1 arranged along a vertical direction, where a first spacing distance between any two adjacent layers of the multi-layer receiving roller conveyor 1-1 is equal, the multi-layer receiving roller conveyor 1-1 is configured to move up and down in a stepwise manner along the vertical direction within the receiving device 1, and a step distance of the multi-layer receiving roller conveyor 1-1 is equal to the first spacing distance; the front lifting device 2 includes a multi-layer front conveying roller conveyor 2-1 arranged along the vertical direction, where a second spacing distance between any two adjacent layers of the multi-layer front conveying roller conveyor 2-1 is equal, and the multi-layer front conveying roller conveyor 2-1 is configured to move up and down along the vertical direction within the front lifting device 2; the transition device 3 includes a multi-layer transition roller conveyor 3-1 arranged along the vertical direction, where a third spacing distance between any two adjacent layers of the multi-layer transition roller conveyor 3-1 is equal; the rear lifting device 4 includes a multi-layer rear conveying roller conveyor 4-1 arranged along the vertical direction, where the multi-layer rear conveying roller conveyor 4-1 is configured to move up and down along the vertical direction within the rear lifting device 4, and a fourth spacing distance between any two adjacent layers of the multi-layer rear conveying roller conveyor 4-1 is equal; the sending device 5 includes a multi-layer sending roller conveyor 5-1 arranged along the vertical direction, where a fifth spacing distance between any two adjacent layers of the multi-layer sending roller conveyor 5-1 is equal, and the multi-layer sending roller conveyor 5-1 is configured to move up and down in a stepwise manner along the vertical direction within the sending device 5, and a step distance of the multi-layer sending roller conveyor 5-1 is equal to the fifth spacing distance. The first spacing distance, the second spacing distance, the third spacing distance, the fourth spacing distance, and the fifth spacing distance are equal, and a number of layers of the multi-layer receiving roller conveyor 1-1, the multi-layer front conveying roller conveyor 2-1, the multi-layer transition roller conveyor 3-1, the multi-layer rear conveying roller conveyor 4-1, and the multi-layer sending roller conveyor 5-1 is equal. Each layer of the multi-layer receiving roller conveyor 1-1, the multi-layer front conveying roller conveyor 2-1, the multi-layer transition roller conveyor 3-1, the multi-layer rear conveying roller conveyor 4-1, and the multi-layer sending roller conveyor 5-1 is used to carry the glass sheets and drive the glass sheets to move. The first spacing distance, the second spacing distance, the third spacing distance, the fourth spacing distance, and the fifth spacing distance allow the glass sheets to pass through and can be adjusted according to the thickness of the glass sheets.

The multi-layer front conveying roller conveyor 2-1 of the front lifting device 2 moves up and down along the vertical direction between an upper end of the front lifting device 2 and a lower end of the front lifting device 2 (i.e., between the front working position of the front lifting device 2 and the front initial position of the front lifting device 2). The multi-layer rear conveying roller conveyor 4-1 of the rear lifting device 4 moves up and down along the vertical direction between an upper end of the rear lifting device 4 and a lower end of the rear lifting device 4 (i.e., between the rear working position of the rear lifting device 4 and the rear initial position of the rear lifting device 4). The process of receiving, using the receiving device 1, the glass sheets conveyed by the front roller conveyor 88 of the original sheet production line includes: aligning a layer of a multi-layer receiving roller conveyor 1-1 of the receiving device 1 with the front roller conveyor 88 of the original sheet production line, conveying the glass sheets on the front roller conveyor 88 to the layer of the multi-layer receiving roller conveyor 1-1, and aligning each layer of the multi-layer receiving roller conveyor 1-1 one-to-one with each layer of a multi-layer front conveying roller conveyor 2-1 of the front lifting device 2 at the front initial position when a last layer of the multi-layer receiving roller conveyor 1-1 is aligned with the front roller conveyor 88. The process of conveying, using the receiving device 1, the glass sheets on the receiving device 1 to the front lifting device 2 at the front initial position docked with the receiving device 1 includes: conveying the glass sheets on the multi-layer receiving roller conveyor 1-1 to the multi-layer front conveying roller conveyor 2-1 after the glass sheets are conveyed to the last layer of the multi-layer receiving roller conveyor 1-1. The process of conveying, using the front lifting device 2, the glass sheets from the front initial position to the front working position, the front lifting device 2 running to the front working position to dock with the transition device 3 includes: conveying, using the multi-layer front conveying roller conveyor 2-1, the glass sheets vertically from the front initial position to the front working position, and aligning each layer of the multi-layer front conveying roller conveyor 2-1 one-to-one with each layer of the multi-layer transition roller conveyor 3-1 of the transition device 3. The process of conveying the glass sheets on the front lifting device 2 to the transition device 3 docked with the front lifting device 2 includes: conveying the glass sheets on the multi-layer front conveying roller conveyor 2-1 to the multi-layer transition roller conveyor 3-1. The process of conveying, using the transition device 3, the glass sheets from one side of the transition device 3 to the other side of the transition device 3 and conveying the glass sheets on the transition device 3 to the rear lifting device 4 at the rear initial position docked with the transition device 3 includes: conveying, using the multi-layer transition roller conveyor 3-1, the glass sheets on the multi-layer transition roller conveyor 3-1 from one side of the transition device 3 to the other side of the transition device 3, and conveying the glass sheets on the multi-layer transition roller conveyor 3-1 to the multi-layer rear conveying roller conveyor 4-1 of the rear lifting device 4, where each layer of the multi-layer transition roller conveyor 3-1 is aligned one-to-one with each layer of the multi-layer rear conveying roller conveyor 4-1, and the multi-layer rear conveying roller conveyor 4-1 is located at the rear initial position. The process of conveying, using the rear lifting device 4, the glass sheets from the rear initial position to the rear working position, the rear lifting device 4 running to the rear working position to dock with the sending device 5 includes: conveying, using the multi-layer rear conveying roller conveyor 4-1, the glass sheets vertically from the rear initial position to the rear working position, and aligning each layer of the multi-layer rear conveying roller conveyor 4-1 one-to-one with each layer of a multi-layer sending roller conveyor 5-1 of the sending device 5. The process of conveying the glass sheets on the rear working position of the rear lifting device 4 to the sending device 5 docked with the rear working position includes: conveying the glass sheets on the multi-layer rear conveying roller conveyor 4-1 to the multi-layer sending roller conveyor 5-1. The process of conveying, using the sending device 5, the glass sheets on the sending device 5 to the rear roller conveyor 99 of the original sheet production line includes: aligning a layer of the multi-layer sending roller conveyor 5-1 with the rear roller conveyor 99 of the original sheet production line, conveying the glass sheets on the layer of the multi-layer sending roller conveyor 5-1 to the rear roller conveyor 99, and repeating the above aligning operation and the above conveying operation until the glass sheets on each layer of the multi-layer sending roller conveyor 5-1 are conveyed to the rear roller conveyor 99.

In an embodiment, the first duration required for the receiving device 1 to load the glass sheets conveyed by the front roller conveyor 88 is not less than the first lifting cycle of the front lifting device 2, where the first lifting cycle is a duration required for the front lifting device 2 to move from the front initial position of the front lifting device 2 to the front working position of the front lifting device 2 and then back to the front initial position from the front working position. Further, the first duration is a duration required for the multi-layer receiving roller conveyor 1-1 of the receiving device 1 to load the glass sheets conveyed by the front roller conveyor 88, which is not less than the first lifting cycle. In an embodiment, the second duration required for the sending device 5 to unload the glass sheets to the rear roller conveyor 99 is not greater than a second lifting cycle of the rear lifting device 4, where the second lifting cycle is a duration required for the rear lifting device 4 to move from the rear initial position of the rear lifting device 4 to the rear working position of the rear lifting device 4 and then back to the rear initial position from the rear working position. Further, the second duration is a duration required for the multi-layer sending roller conveyor 5-1 of the sending device 5 to unload the glass sheets to the rear roller conveyor 99, which is not greater than the second lifting cycle.

In an embodiment, in order to convey more glass sheets during the first lifting cycle of the front lifting device 2 and the second lifting cycle of the rear lifting device 4, the number of layers of the multi-layer receiving roller conveyor 1-1, the multi-layer front conveying roller conveyor 2-1, the multi-layer transition roller conveyor 3-1, the multi-layer rear conveying roller conveyor 4-1, and the multi-layer sending roller conveyor 5-1 is three.

In an embodiment, the glass sheets include one or more of whole glass, middle partition glass, and multi-partition glass. In an embodiment, the multi-layer receiving roller conveyor 1-1, the multi-layer front conveying roller conveyor 2-1, the multi-layer transition roller conveyor 3-1, the multi-layer rear conveying roller conveyor 4-1, and the multi-layer sending roller conveyor 5-1 are belt conveyors or roller conveyors. In an embodiment, the multi-layer receiving roller conveyor 1-1, the multi-layer front conveying roller conveyor 2-1, the multi-layer rear conveying roller conveyor 4-1, and the multi-layer sending roller conveyor 5-1 move up and down through chain drive, gear drive or synchronous belt drive. The glass sheets conveyed to the rear roller conveyor 99 of the original sheet production line are further processed or stacked for storage.

In an embodiment, as shown in FIG. 1, when the transition device 3 is the bridge-type structure and is located above the avoidance channel 6, the front lifting device 2 conveys the glass sheets from the receiving device 1 upward to the transition device 3, and the rear lifting device 4 conveys the glass sheets from the transition device 3 downward to the sending device 5. As shown in FIG. 1, the front initial position of the front lifting device 2 is docked with the receiving device 1, the front working position of the front lifting device 2 is docked with the transition device 3, the rear initial position of the rear lifting device 4 is docked with the transition device 3, and the front working position of the rear lifting device 4 is docked with the sending device 5. The process of conveying, using the front lifting device 2, the glass sheets from the front initial position to the front working position docked with the transition device 3 includes: conveying, using the multi-layer front conveying roller conveyor 2-1, the glass sheets vertically upward from the front initial position to the front working position, and aligning each layer of the multi-layer front conveying roller conveyor 2-1 one-to-one with each layer of a multi-layer transition roller conveyor 3-1 of the transition device 3; the process of conveying, using the rear lifting device 4, the glass sheets from the rear initial position to the rear working position docked with the sending device 5 includes: conveying, using the multi-layer rear conveying roller conveyor 4-1, the glass sheets vertically downward from the rear initial position to the rear working position, and aligning each layer of the multi-layer rear conveying roller conveyor 4-1 one-to-one with each layer of the multi-layer sending roller conveyor 5-1 of the sending device 5. Pedestrians and forklifts can directly pass through the glass production line at any time from the workshop floor in the avoidance channel 6 below the transition device 3, where the avoidance channel 6 refers to a space formed by the workshop floor, the front lifting device 2, the transition device 3, and the rear lifting device 4 in FIG. 1.

In an embodiment, as shown in FIG. 1, the avoidance conveying device includes a supporting protective wall 7, which is arranged in a space formed by the front lifting device 2, the transition device 3, and the rear lifting device 4, and the transition device 3 is installed at a top of the supporting protective wall 7.

In an embodiment, as shown in FIG. 2, the transition device 3 is an underground structure and is located below the avoidance channel 6. The front lifting device 2 conveys the glass sheets from the receiving device 1 downward to the transition device 3 and the rear lifting device 4 conveys the glass sheets from the transition device 3 upward to the sending device 5. As shown in FIG. 2, an upper end, i.e., the front initial position of the front lifting device 2 is docked with the receiving device 1, a lower end, i.e., the front working position of the front lifting device 2 is docked with the transition device 3, a lower end, i.e., the rear initial position of the rear lifting device 4 is docked with the transition device 3, and an upper end, i.e., the rear working position of the rear lifting device 4 is docked with the sending device 5. The process of conveying, using the front lifting device 2, the glass sheets from the front initial position to the front working position docked with the transition device 3 includes: conveying, using the multi-layer front conveying roller conveyor 2-1, the glass sheets vertically downward from the front initial position to the front working position, and aligning each layer of the multi-layer front conveying roller conveyor 2-1 one-to-one with each layer of a multi-layer transition roller conveyor 3-1 of the transition device 3; the process of conveying, using the rear lifting device 4, the glass sheets from the rear initial position to the rear working position docked with the sending device 5 includes: conveying, using the multi-layer rear conveying roller conveyor 4-1, the glass sheets vertically upward from the rear initial position to the rear working position, and aligning each layer of the multi-layer rear conveying roller conveyor 4-1 one-to-one with each layer of the multi-layer sending roller conveyor 5-1 of the sending device 5. Pedestrians and forklifts can directly pass through the glass production line at any time from the workshop floor in the avoidance channel 6 above the transition device 3, where the avoidance channel 6 refers to a space formed by the workshop floor, the front lifting device 2, and the rear lifting device 4 in FIG. 2. Compared with the transition device 3 being the bridge-type structure and being located above the avoidance channel 6, when the transition device 3 is the underground structure and is located below the avoidance channel 6, the height of the avoidance channel 6 is not limited by the transition device 3, and the avoidance channel 6 allows pedestrians and forklifts of any height to pass through the avoidance channel 6.

The present disclosure further provides an avoidance conveying method, which is applied to the above avoidance conveying device for the glass production line. A first end of the front lifting device 2 away from the transition device 3 is a front initial position, a second end of the front lifting device 2 close to the transition device 3 is a front working position, a first end of the rear lifting device 4 close to the transition device 3 is a rear initial position, and a second end of the rear lifting device 4 away from the transition device 3 is a rear working position. The avoidance conveying method includes:

step S1, receiving, using the receiving device 1, the glass sheets conveyed by the front roller conveyor 88 of the original sheet production line;

step S2, conveying, using the receiving device 1, the glass sheets on the receiving device 1 to the front lifting device at the front initial position docked with the receiving device 1;

step S3, conveying, using the front lifting device 2, the glass sheets from the front initial position to the front working position, the front lifting device 2 running to the front working position to dock with the transition device 3;

step S4, conveying the glass sheets on the front lifting device 2 to the transition device 3 docked with the front lifting device 2;

step S5, conveying, using the transition device 3, the glass sheets from one side of the transition device 3 to the other side of the transition device 3, and conveying the glass sheets on the transition device 3 to the rear lifting device 4 at the rear initial position docked with the transition device 3;

step S6, conveying, using the rear lifting device 4, the glass sheets from the rear initial position to the rear working position, the rear lifting device 4 running to the rear working position to dock with the sending device 5;

step S7, conveying, the glass sheets on the rear working position of the rear lifting device 4 to the sending device 5 docked with the rear working position; and step S8, conveying, using the sending device 5, the glass sheets on the sending device 5 to the rear roller conveyor 99 of the original sheet production line.

In the avoidance conveying method, the avoidance channel 6 between the front lifting device 2 and the rear lifting device 4 allows pedestrians and forklifts to pass through the glass production line at any time, and the receiving device 1, the front lifting device 2, the transition device 3, the rear lifting device 4, and the sending device 5 sequentially convey the glass sheets from the front roller conveyor 88 to the rear roller conveyor 99 of the original sheet production line to bypass the avoidance channel 6.

In the avoidance conveying method of the present disclosure, the receiving device 1, the front lifting device 2, the transition device 3, the rear lifting device 4, and the sending device 5 sequentially convey the glass sheets from the front roller conveyor 88 to the rear roller conveyor 99 of the original sheet production line. Because the glass sheets bypass the avoidance channel 6 between the front lifting device 2 and the rear lifting device 4 during conveying, pedestrians and forklifts can directly pass through the glass production line at any time from the avoidance channel 6. Therefore, the present disclosure ensures continuous and uninterrupted production operations (e.g., continuously and uninterruptedly conveying the glass sheets) on the glass production line, and shorts the travel distance and the travel duration of pedestrians and forklifts. That is, the present disclosure solves the technical problem of the production efficiency of glass being affected due to pedestrians and forklifts having to take a detour from an end of the glass production line in the related art, and also provides technical support for efficient processing and production of the entire glass production lines.

In an embodiment, step S1 includes: aligning a layer of a multi-layer receiving roller conveyor 1-1 of the receiving device 1 with the front roller conveyor 88 of the original sheet production line, conveying the glass sheets on the front roller conveyor 88 to the layer of the multi-layer receiving roller conveyor 1-1, and aligning each layer of the multi-layer receiving roller conveyor 1-1 one-to-one with each layer of a multi-layer front conveying roller conveyor 2-1 of the front lifting device 2 at the front initial position when a last layer of the multi-layer receiving roller conveyor 1-1 is aligned with the front roller conveyor 88;

step S2 includes: conveying the glass sheets on the multi-layer receiving roller conveyor 1-1 to the multi-layer front conveying roller conveyor 2-1;

step S3 includes: conveying, using the multi-layer front conveying roller conveyor, the glass sheets vertically from the front initial position to the front working position, and aligning each layer of the multi-layer front conveying roller conveyor 2-1 one-to-one with each layer of a multi-layer transition roller conveyor 3-1 of the transition device 3;

step S4 includes: conveying the glass sheets on the multi-layer front conveying roller conveyor 2-1 to the multi-layer transition roller conveyor 3-1;

step S5 includes: conveying, using the multi-layer transition roller conveyor 3-1, the glass sheets from one side of the transition device 3 to the other side of the transition device 3, and conveying the glass sheets on the multi-layer transition roller conveyor 3-1 to a multi-layer rear conveying roller conveyor 4-1 of the rear lifting device 4, where each layer of the multi-layer transition roller conveyor 3-1 is aligned one-to-one with each layer of the multi-layer rear conveying roller conveyor, and the multi-layer rear conveying roller conveyor 4-1 is located at the rear initial position;

step S6 includes: conveying, using the multi-layer rear conveying roller conveyor 4-1, the glass sheets vertically from the rear initial position to the rear working position, and aligning each layer of the multi-layer rear conveying roller conveyor 4-1 one-to-one with each layer of a multi-layer sending roller conveyor 5-1 of the sending device 5;

step S7 includes: conveying, the glass sheets on the multi-layer rear conveying roller conveyor 4-1 to the multi-layer sending roller conveyor 5-1; and step S8 includes: aligning a layer of the multi-layer sending roller conveyor 5-1 with the rear roller conveyor 99 of the original sheet production line, conveying the glass sheets on the layer of the multi-layer sending roller conveyor 5-1 to the rear roller conveyor 99, and repeating the aligning operation and the conveying operation in step S8 until the glass sheets on each layer of the multi-layer sending roller conveyor 5-1 are conveyed to the rear roller conveyor 99.

In an embodiment, when the transition device 3 is the bridge-type structure and is located above the avoidance channel 6, step S3 includes: in the front lifting device 2, conveying, using the multi-layer front conveying roller conveyor 2-1, the glass sheets vertically upward from the front initial position to the front working position, and aligning each layer of the multi-layer front conveying roller conveyor 2-1 one-to-one with each layer of the multi-layer transition roller conveyor 2-1; and step S6 includes: in the rear lifting device 4, conveying, using the multi-layer rear conveying roller conveyor 4-1, the glass sheets vertically downward from the rear initial position to the rear working position, and aligning each layer of the multi-layer rear conveying roller conveyor 4-1 one-to-one with each layer of the multi-layer sending roller conveyor 5-1.

In an embodiment, when the transition device 3 is the bridge-type structure and is located above the avoidance channel 6, a lower end, i.e., the front initial position of the front lifting device 2 is docked with the receiving device 1, an upper end, i.e., the front working position of the front lifting device 2 is docked with the transition device 3, an upper end, i.e., the rear initial position of the rear lifting device 4 is docked with the transition device 3, and a lower end, i.e., the rear working position of the rear lifting device 4 is docked with the sending device 5. Pedestrians and forklifts can directly pass through the glass production line at any time from the workshop floor in the avoidance channel 6 below the transition device 3, where the avoidance channel 6 refers to a space formed by the workshop floor, the front lifting device 2, the transition device 3, and the rear lifting device 4 in FIG. 1.

In an embodiment, when the transition device 3 is the bridge-type structure and is located above the avoidance channel 6, after step S2, the avoidance conveying method also includes: resetting the multi-layer receiving roller conveyor 1-1 to align a bottom layer of the multi-layer receiving roller conveyor 1-1 with the front roller conveyor 88 of the original sheet production line.

In an embodiment, when the transition device 3 is the bridge-type structure and is located above the avoidance channel 6, after step S4, the avoidance conveying method also includes: resetting the multi-layer front conveying roller conveyor 2-1 to the front initial position.

In an embodiment, when the transition device 3 is the bridge-type structure and is located above the avoidance channel 6, after step S7, the avoidance conveying method also includes: resetting the multi-layer rear conveying roller conveyor 4-1 to the rear initial position, and aligning each layer of the multi-layer rear conveying roller conveyor 4-1 one-to-one with each layer of the multi-layer transition roller conveyor 3-1.

In an embodiment, when the transition device 3 is the bridge-type structure and is located above the avoidance channel 6, after step S8, the avoidance conveying method also includes: resetting the multi-layer sending roller conveyor 5-1 to align a top layer of the multi-layer sending roller conveyor 5-1 with the rear roller conveyor 99 of the original sheet production line, which ensures continuous and uninterrupted transportation of the glass sheets.

In an embodiment, when the transition device 3 is the underground structure and is located below the avoidance channel 6, step S3 includes: in the front lifting device 2, conveying, using the multi-layer front conveying roller conveyor 2-1, the glass sheets vertically downward from the front initial position to the front working position, and aligning each layer of the multi-layer front conveying roller conveyor 2-1 one-to-one with each layer of the multi-layer transition roller conveyor 3-1; and step S6 includes: in the rear lifting device 4, conveying, using the multi-layer rear conveying roller conveyor 4-1, the glass sheets vertically upward from the rear initial position to the rear working position, and aligning each layer of the multi-layer rear conveying roller conveyor 4-1 one-to-one with each layer of the multi-layer sending roller conveyor 5-1.

In an embodiment, when the transition device 3 is the underground structure and is located below the avoidance channel 6, an upper end, i.e., the front initial position of the front lifting device 2 is docked with the receiving device 1, and a lower end, i.e., the front working position of the front lifting device 2 is docked with the transition device 3, a lower end, i.e., the rear initial position of the rear lifting device 4 is docked with the transition device 3, and an upper end, i.e., the rear working position of the rear lifting device 4 is docked with the sending device 5. Pedestrians and forklifts can pass through the glass production line at any time from the workshop floor in the avoidance channel 6 above the transition device 3, where the avoidance channel 6 refers to a space formed by the workshop floor, the front lifting device 2, and the rear lifting device 4 in FIG. 2. Compared with the transition device 3 being the bridge-type structure and being located above the avoidance channel 6, when the transition device 3 is the underground structure and is located below the avoidance channel 6, the height of the avoidance channel 6 is not limited by the transition device 3 and the avoidance channel 6 allow pedestrians and forklifts of any height to pass through the avoidance channel 6.

In an embodiment, when the transition device 3 is the underground structure and is located below the avoidance channel 6, after step S2, the avoidance conveying method also includes: resetting the multi-layer receiving roller conveyor 1-1 to align a top layer of the multi-layer receiving roller conveyor 1-1 with the front roller conveyor 88 of the original sheet production line.

In an embodiment, when the transition device 3 is the underground structure and is located below the avoidance channel 6, after step S4, the avoidance conveying method also includes: resetting the multi-layer front conveying roller conveyor 2-1 to the front initial position.

In an embodiment, when the transition device 3 is the underground structure and is located below the avoidance channel 6, after step S7, the avoidance conveying method also includes: resetting the multi-layer rear conveying roller conveyor 4-1 to the rear initial position, and aligning each layer of the multi-layer rear conveying roller conveyor 4-1 one-to-one with each layer of the multi-layer transition roller conveyor 3-1.

In an embodiment, when the transition device 3 is the underground structure and is located below the avoidance channel 6, after step S8, the avoidance conveying method also includes: resetting the multi-layer sending roller conveyor 5-1 to align a bottom layer of the multi-layer sending roller conveyor 5-1 with the rear roller conveyor 99 of the original sheet production line, which ensures continuous and uninterrupted transportation of the glass sheets.

In addition, when the glass production line is very long, setting up one avoidance conveying device as described above cannot meet the needs of pedestrians and forklifts. Therefore, the present disclosure provides a glass production line including a plurality of avoidance conveying devices, which ensures the traffic efficiency of pedestrians and forklifts during the glass production process. In an embodiment, at least one of the plurality of avoidance conveying devices includes a transition device having a bridge-type structure, and at least one of the plurality of avoidance conveying devices includes a transition device having an underground structure. Each of the plurality of avoidance conveying devices conveys the glass sheets using the avoidance conveying methods as described above.

The above embodiments are illustrative of the present disclosure rather than restrictive of the scope of the present disclosure. It should be noted that all equivalent modifications and changes made by persons skilled in the art without departing from the spirit and technical concepts disclosed in the present disclosure shall still be deemed falling within the scope of the present disclosure.

What is claimed is:

1. An avoidance conveying method for a glass production line, applied to an avoidance conveying device for the glass production line, wherein the avoidance conveying device for the glass production line comprises a receiving device, a front lifting device, a transition device, a rear lifting device, and a sending device arranged in sequence along a direction of conveying glass sheets, wherein the avoidance conveying device is set to be a symmetrical structure centered on the transition device, wherein the receiving device is configured to receive the glass sheets conveyed by a front roller conveyor of an original sheet production line; wherein the front lifting device is configured to convey the glass sheets from the receiving device to the transition device; wherein the transition device is configured to convey the glass sheets from the front lifting device to the rear lifting device; wherein the rear lifting device is configured to convey the glass sheets from the transition device to the sending device; wherein the sending device is configured to convey the glass sheets to a rear roller conveyor of the original sheet production line; wherein a first end of the front lifting device away from the transition device is a front initial position, a second end of the front lifting device close to the transition device is a front working position, a first end of the rear lifting device close to the transition device is a rear initial position, and a second end of the rear lifting device away from the transition device is a rear working position, wherein the avoidance conveying method comprises:

step S1, receiving, using the receiving device, the glass sheets conveyed by the front roller conveyor of the original sheet production line;

step S2, conveying, using the receiving device, the glass sheets on the receiving device to the front lifting device at the front initial position docked with the receiving device;

step S3, conveying, using the front lifting device, the glass sheets from the front initial position to the front working position, wherein the front lifting device runs to the front working position to dock with the transition device;

step S4, conveying the glass sheets on the front lifting device to the transition device docked with the front lifting device;

step S5, conveying, using the transition device, the glass sheets from one side of the transition device to the other side of the transition device, and conveying the glass sheets on the transition device to the rear lifting device at the rear initial position docked with the transition device;

step S6, conveying, using the rear lifting device, the glass sheets from the rear initial position to the rear working position, wherein the rear lifting device runs to the rear working position to dock with the sending device;

step S7, conveying, the glass sheets on the rear working position of the rear lifting device to the sending device docked with the rear working position; and step S8, conveying, using the sending device, the glass sheets on the sending device to the rear roller conveyor of the original sheet production line;

wherein an avoidance channel is formed between the front lifting device and the rear lifting device, wherein the avoidance channel between the front lifting device and the rear lifting device is configured for pedestrians and forklifts to pass through the glass production line at any time, and the receiving device, the front lifting device, the transition device, the rear lifting device, and the sending device are configured to sequentially convey the glass sheets from the front roller conveyor to the rear roller conveyor of the original sheet production line to bypass the avoidance channel.

2. The avoidance conveying method for the glass production line according to claim 1, wherein a first duration required for the receiving device to load the glass sheets conveyed by the front roller conveyor is not less than a first lifting cycle of the front lifting device, wherein the first lifting cycle is a duration required for the front lifting device to move from a front initial position of the front lifting device to a front working position of the front lifting device and then back to the front initial position from the front working position;

wherein a second duration required for the sending device to unload the glass sheets to the rear roller conveyor is not greater than a second lifting cycle of the rear lifting device, wherein the second lifting cycle is a duration required for the rear lifting device to move from a rear initial position of the rear lifting device to a rear working position of the rear lifting device and then back to the rear initial position from the rear working position.

3. The avoidance conveying method for the glass production line according to claim 2, wherein the receiving device comprises a multi-layer receiving roller conveyor arranged along a vertical direction, wherein a first spacing distance between any two adjacent layers of the multi-layer receiving roller conveyor is equal, and the multi-layer receiving roller conveyor is configured to move up and down in a stepwise manner along the vertical direction within the receiving device, wherein a step distance of the multi-layer receiving roller conveyor is equal to the first spacing distance; wherein the front lifting device comprises a multi-layer front conveying roller conveyor arranged along the vertical direction, wherein a second spacing distance between any two adjacent layers of the multi-layer front conveying roller conveyor is equal, and the multi-layer front conveying roller conveyor is configured to move up and down along the vertical direction within the front lifting device; wherein the transition device comprises a multi-layer transition roller conveyor arranged along the vertical direction, wherein a third spacing distance between any two adjacent layers of the multi-layer transition roller conveyor is equal; wherein the rear lifting device comprises a multi-layer rear conveying roller conveyor arranged along the vertical direction, wherein the multi-layer rear conveying roller conveyor is configured to move up and down along the vertical direction within the rear lifting device, wherein a fourth spacing distance between any two adjacent layers of the multi-layer rear conveying roller conveyor is equal; wherein the sending device comprises a multi-layer sending roller conveyor arranged along the vertical direction, wherein a fifth spacing distance between any two adjacent layers of the multi-layer sending roller conveyor is equal, and the multi-layer sending roller conveyor is configured to move up and down in a stepwise manner along the vertical direction within the sending device, wherein a step distance of the multi-layer sending roller conveyor is equal to the fifth spacing distance; wherein the first spacing distance, the second spacing distance, the third spacing distance, the fourth spacing distance, and the fifth spacing distance are equal, and a number of layers of the multi-layer receiving roller conveyor, the multi-layer front conveying roller conveyor, the multi-layer transition roller conveyor, the multi-layer rear conveying roller conveyor, and the multi-layer sending roller conveyor is equal;

wherein step S1 comprises: aligning a layer of a multi-layer receiving roller conveyor of the receiving device with the front roller conveyor of the original sheet production line, conveying the glass sheets on the front roller conveyor to the layer of the multi-layer receiving roller conveyor, and aligning each layer of the multi-layer receiving roller conveyor one-to-one with each layer of a multi-layer front conveying roller conveyor of the front lifting device at the front initial position when a last layer of the multi-layer receiving roller conveyor is aligned with the front roller conveyor;

wherein step S2 comprises: conveying the glass sheets on the multi-layer receiving roller conveyor to the multi-layer front conveying roller conveyor;

wherein step S3 comprises: conveying, using the multi-layer front conveying roller conveyor, the glass sheets vertically from the front initial position to the front working position, and aligning each layer of the multi-layer front conveying roller conveyor one-to-one with each layer of a multi-layer transition roller conveyor of the transition device;

wherein step S4 comprises: conveying the glass sheets on the multi-layer front conveying roller conveyor to the multi-layer transition roller conveyor;

wherein step S5 comprises: conveying, using the multi-layer transition roller conveyor, the glass sheets from one side of the transition device to the other side of the transition device, and conveying the glass sheets on the multi-layer transition roller conveyor to a multi-layer rear conveying roller conveyor of the rear lifting device, wherein each layer of the multi-layer transition roller conveyor is aligned one-to-one with each layer of the multi-layer rear conveying roller conveyor, and the multi-layer rear conveying roller conveyor is located at the rear initial position;

wherein step S6 comprises: conveying, using the multi-layer rear conveying roller conveyor, the glass sheets vertically from the rear initial position to the rear working position, and aligning each layer of the multi-layer rear conveying roller conveyor one-to-one with each layer of a multi-layer sending roller conveyor of the sending device;

wherein step S7 comprises: conveying, the glass sheets on the multi-layer rear conveying roller conveyor to the multi-layer sending roller conveyor; and wherein step S8 comprises: aligning a layer of the multi-layer sending roller conveyor with the rear roller conveyor of the original sheet production line, conveying the glass sheets on the layer of the multi-layer sending roller conveyor to the rear roller conveyor, and repeating the aligning operation and the conveying operation in step S8 until the glass sheets on each layer of the multi-layer sending roller conveyor are conveyed to the rear roller conveyor.

4. The avoidance conveying method for the glass production line according to claim 3, wherein the first duration is a duration required for the multi-layer receiving roller conveyor of the receiving device to load the glass sheets conveyed by the front roller conveyor, which is not less than the first lifting cycle, and the second duration is a duration required for the multi-layer sending roller conveyor of the sending device to unload the glass sheets to the rear roller conveyor, which is not greater than the second lifting cycle.

5. The avoidance conveying method for the glass production line according to claim 4, wherein the glass sheets comprise one or more of whole glass, middle partition glass, and multi-partition glass.

6. The avoidance conveying method for the glass production line according to claim 4, wherein the multi-layer receiving roller conveyor, the multi-layer front conveying roller conveyor, the multi-layer transition roller conveyor, the multi-layer rear conveying roller conveyor, and the multi-layer sending roller conveyor are belt conveyors or roller conveyors.

7. The avoidance conveying method for the glass production line according to claim 4, wherein the multi-layer receiving roller conveyor, the multi-layer front conveying roller conveyor, the multi-layer rear conveying roller conveyor, and the multi-layer sending roller conveyor move up and down through chain drive, gear drive or synchronous belt drive.

8. The avoidance conveying method for the glass production line according to claim 3, wherein upon the transition device being a bridge-type structure and being located above the avoidance channel, the front lifting device is configured to convey the glass sheets from the receiving device upward to the transition device, and the rear lifting device is configured to convey the glass sheets from the transition device downward to the sending device, wherein when the transition device is a bridge-type structure and is located above the avoidance channel, step S3 comprises: in the front lifting device, conveying, using the multi-layer front conveying roller conveyor, the glass sheets vertically upward from the front initial position to the front working position, and aligning each layer of the multi-layer front conveying roller conveyor one-to-one with each layer of the multi-layer transition roller conveyor; and step S6 comprises: in the rear lifting device, conveying, using the multi-layer rear conveying roller conveyor, the glass sheets vertically downward from the rear initial position to the rear working position, and aligning each layer of the multi-layer rear conveying roller conveyor one-to-one with each layer of the multi-layer sending roller conveyor.

9. The avoidance conveying method for the glass production line according to claim 8, wherein the avoidance conveying device further comprises a supporting protective wall, arranged in a space formed by the front lifting device, the transition device, and the rear lifting device, wherein the transition device is installed at a top of the supporting protective wall.

10. The avoidance conveying method for the glass production line according to claim 8, wherein after step S2, the avoidance conveying method further comprises:

resetting the multi-layer receiving roller conveyor to align a bottom layer of the multi-layer receiving conveyor with the front roller conveyor of the original sheet production line.

11. The avoidance conveying method for the glass production line according to claim 8, wherein after step S4, the avoidance conveying method further comprises:
resetting the multi-layer front conveying roller conveyor to the front initial position.

12. The avoidance conveying method for the glass production line according to claim 8, wherein after step S7, the avoidance conveying method further comprises:
resetting the multi-layer rear conveying roller conveyor to the rear initial position, and aligning each layer of the multi-layer rear conveying roller conveyor one-to-one with each layer of the multi-layer transition roller conveyor.

13. The avoidance conveying method for the glass production line according to claim 8, wherein after step S8, the avoidance conveying method further comprises:
resetting the multi-layer sending roller conveyor to align a top layer of the multi-layer sending roller conveyor with the rear roller conveyor of the original sheet production line.

14. The avoidance conveying method for the glass production line according to claim 3, wherein upon the transition device being an underground structure and being located below the avoidance channel, the front lifting device is configured to convey the glass sheets from the receiving device downward to the transition device, and the rear lifting device is configured to convey the glass sheets from the transition device upward to the sending device,
wherein when the transition device is an underground structure and is located below the avoidance channel,
step S3 comprises: in the front lifting device, conveying, using the multi-layer front conveying roller conveyor, the glass sheets vertically downward from the front initial position to the front working position, and aligning each layer of the multi-layer front conveying roller conveyor one-to-one with each layer of the multi-layer transition roller conveyor; and
step S6 comprises: in the rear lifting device, conveying, using the multi-layer rear conveying roller conveyor, the glass sheets vertically upward from the rear initial position to the rear working position, and aligning each layer of the multi-layer rear conveying roller conveyor one-to-one with each layer of the multi-layer sending roller conveyor.

15. The avoidance conveying method for the glass production line according to claim 14, wherein after step S2, the avoidance conveying method further comprises:
resetting the multi-layer receiving roller conveyor to align a top layer of the multi-layer receiving roller conveyor with the front roller conveyor of the original sheet production line.

16. The avoidance conveying method for the glass production line according to claim 14, wherein after step S4, the avoidance conveying method further comprises:
resetting the multi-layer front conveying roller conveyor to the front initial position.

17. The avoidance conveying method for the glass production line according to claim 14, wherein after step S7, the avoidance conveying method further comprises:
resetting the multi-layer rear conveying roller conveyor to the rear initial position, and aligning each layer of the multi-layer rear conveying roller conveyor one-to-one with each layer of the multi-layer transition roller conveyor.

18. The avoidance conveying method for the glass production line according to claim 14, wherein after step S8, the avoidance conveying method further comprises:
resetting the multi-layer sending roller conveyor to align a bottom layer of the multi-layer sending roller conveyor with the rear roller conveyor of the original sheet production line.

19. A glass production line comprising a plurality of avoidance conveying devices, wherein each of the plurality of avoidance conveying devices conveys the glass sheets using an avoidance conveying method according to claim 1, wherein each of the plurality of avoidance conveying devices comprises a receiving device, a front lifting device, a transition device, a rear lifting device, and a sending device arranged in sequence along a direction of conveying glass sheets, wherein the avoidance conveying device is set to be a symmetrical structure centered on the transition device,
wherein the receiving device is configured to receive the glass sheets conveyed by a front roller conveyor of an original sheet production line;
wherein the front lifting device is configured to convey the glass sheets from the receiving device to the transition device;
wherein the transition device is configured to convey the glass sheets from the front lifting device to the rear lifting device;
wherein the rear lifting device is configured to convey the glass sheets from the transition device to the sending device;
wherein the sending device is configured to convey the glass sheets to a rear roller conveyor of the original sheet production line;
wherein an avoidance channel is formed between the front lifting device and the rear lifting device, wherein the receiving device, the front lifting device, the transition device, the rear lifting device, and the sending device are configured to sequentially convey the glass sheets from the front roller conveyor to the rear roller conveyor of the original sheet production line to make the glass sheets bypass the avoidance channel.

20. The glass production line according to claim 19, wherein at least one of the plurality of avoidance conveying devices comprises a transition device having a bridge-type structure, and at least one of the plurality of avoidance conveying devices comprises a transition device having an underground structure,
wherein upon the transition device being a bridge-type structure and being located above the avoidance channel, the front lifting device is configured to convey the glass sheets from the receiving device upward to the transition device, and the rear lifting device is configured to convey the glass sheets from the transition device downward to the sending device;
wherein upon the transition device being an underground structure and being located below the avoidance channel, the front lifting device is configured to convey the glass sheets from the receiving device downward to the transition device, and the rear lifting device is configured to convey the glass sheets from the transition device upward to the sending device.

* * * * *